United States Patent
Brimshan et al.

(10) Patent No.: US 8,917,859 B1
(45) Date of Patent: Dec. 23, 2014

(54) OUTBOUND DIALING SOLUTIONS FOR MPS IVR

(71) Applicant: Cellco Partnership, Basking Ridge, NJ (US)

(72) Inventors: Michael Brimshan, Old Bridge, NJ (US); Charles J. Forsythe, Morris Plains, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/954,415

(22) Filed: Jul. 30, 2013

(51) Int. Cl.
  *H04M 3/00* (2006.01)
  *H04M 5/00* (2006.01)
  *H04M 3/51* (2006.01)

(52) U.S. Cl.
  CPC .................................. *H04M 3/5158* (2013.01)
  USPC ............. 379/265.09; 379/88.01; 379/266.01; 379/266.07

(58) Field of Classification Search
  CPC ... H04M 3/51; H04M 3/5158; H04M 3/5166; H04M 3/5183
  USPC .................. 379/265.09, 266.07, 266.01, 242, 379/88.01, 266.08, 265.1
  See application file for complete search history.

(56) References Cited

U.S. PATENT DOCUMENTS

| 8,363,819 B2 * | 1/2013 | Zgardovski et al. ...... 379/266.07 |
| 2013/0208882 A1 * | 8/2013 | Zgardovski et al. ...... 379/265.09 |

* cited by examiner

*Primary Examiner* — Thjuan K Addy

(57) ABSTRACT

A system and method for automated communication to at least one end user. In one example, a system includes an interactive voice response (IVR) platform and a decision engine for creating a campaign that configures the IVR platform to perform outbound calls to the at least one end user to execute a task. The IVR based system calls the at least one end user based on the created campaign, records results of the call which indicate execution status of the task, and controls the future calls made by the campaign based on the results of the at least one call.

20 Claims, 8 Drawing Sheets

OUTBOUND DIALING SOLUTIONS FOR MPS IVR

BACKGROUND

Voice portals are used to answer calls and obtain information from callers. For example, businesses often use voice portals that include interactive voice response (IVR) systems to interact with callers and to obtain information from the callers. IVR systems also may be used by businesses to make outgoing calls to customers and/or potential customers.

The IVR system may be combined or associated with an automatic call distributor (ACD) or the like, so that under certain conditions of the IVR processing of a call, the call may be transferred to an available agent (e.g. customer service representative) of the enterprise for further interaction with the customer or prospective customer. As an outbound call example, an enterprise may desire to set-up a campaign or call prospective customers to offer a special deal to any prospect that signs-up as a new customer to call existing customers behind in account payments to ask for payment. In examples like these, when the IVR interaction is successful at some point in the automated conversation, the IVR passes the call off via the ACD to an agent to complete the transaction, e.g. payment for a new customer and/or payment from an existing customer that had been in arrears. The IVR interaction may also terminate with a completed self service transaction.

Current outbound IVR solutions have multiple limitations including not being scalable for specific business requirements, and not having centralized management for effectively controlling the outbound calls and results of those calls. These current outbound solutions also do not include an interface that allows users to manage/configure the outbound solution. These current outbound solutions also do not integrate with a Media Processing Server (MPS) that executes the IVR solutions.

BRIEF DESCRIPTION OF THE DRAWINGS

The features of the subject technology are set forth in the appended claims. However, for purpose of explanation, several examples of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
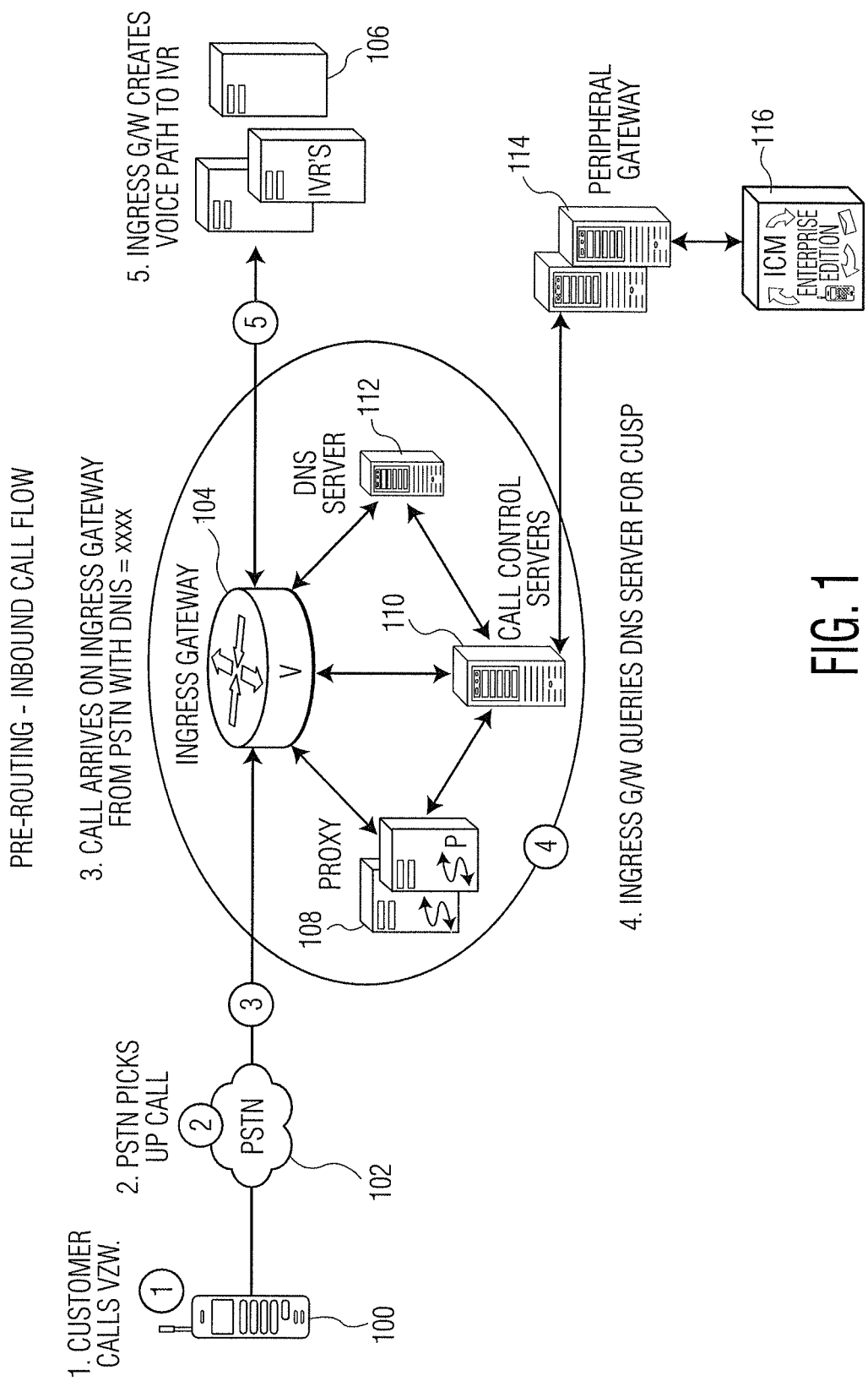
FIG. 1 shows a block diagram representing an example of the components for executing an inbound call flow from the customer to the IVR based system.

FIG. 1 shows a block diagram of components for inbound call flow to an IVR based system. In step 1, customer 100 calls the enterprise. In step 2, the call is picked up by the public switched telephone network (PSTN) 102. In step 3, the call arrives on the ingress gateway 104 with the dialed phone number. In step 4, the ingress gateway solicits proxy 108 to select a call control server (CCS). Ingress gateway 104 informs CCS 110 of the call with the dialed number, and CCS sends a route request to a peripheral gateway 114, which in turn sends a request for routing to ICM 116. ICM 116 returns a route label to the CCS 110 via gateway 114. CCS 110 then solicits the proxy 108 for an IVR that corresponds to the route label. CCS 110 then instructs ingress gateway 104 to create a voice path from end user 100 to the IVR. In step 5, ingress gateway 104 sets up the voice path to the customer.

IVRs 106 as shown in FIG. 1 can also execute outbound calls to the customers. Being able to control, monitor and modify an IVR based system (i.e. a system including at least one IVR platform including IVR hardware) to perform outbound call campaigns is beneficial to certain enterprises attempting to execute specific customer based tasks.

For example, many customers owe past due balances on their customer accounts with enterprises (e.g. phone/internet providers). An enterprise would benefit if an IVR based system could be programmed to perform the task of automatically calling these customers and monitoring progress of the calls in an attempt to collect payments on the past due accounts.

In general, an outbound call campaign is a process where a number of specified end users (e.g. customers) are called by the automated IVR based system to accomplish a specific task (e.g. debt collection). The end users targeted by the campaign may be specified by at least one database that stores personal customer information (e.g. phone numbers, account balance, payment history, etc.). These databases may be managed by the enterprise itself (e.g. internal databases with existing customer information), or provided by third parties who collect consumer information (e.g. data collection agencies). The campaign may also include a number of parameters such as preferred times of the day/week to call the end users, and a number of passes (i.e. the number of times to call the end users to accomplish the task). The campaign may also include an execution status of the task that indicates if the end users have actually connected to the IVR system (e.g. how many end users have paid the debt as a result of the campaign).

Assume an enterprise has 1,000 customers who owe on past due accounts. A campaign can be created by the enterprise to collect debts from these 1,000 customers. The campaign may extract the phone numbers for customers 1-1,000 from the internal customer database. The campaign may then make calls to customers 1-1,000 attempting to connect the customers to the IVR based system and collect the outstanding debt. Assuming customers 1-1,000 are first time offenders, the campaign may allow the voice prompts of the IVR to automatically collect the debt without the use of a live agent. If customers 1-1,000 are repeat offenders, the campaign may force the customers to immediately connect with a live agent to resolve the debt. The campaign will place the outbound calls and repeat the calls if necessary (i.e. call multiple times until the customer is actually connected to the IVR system). The results (e.g. if the customer connected to the IVR and/or if the customer paid the debt) of the campaign will be recorded by the IVR based system and displayed to administrators working for the enterprise. Based on the results, the administrators could program the IVR based system to modify the campaign (e.g. place additional calls more/less frequently, call new customers, call customers at different times, etc.). For example, if customers 1-499 pay their debts, and customers 501-1,000 do not, the campaign may be modified to place more frequent and aggressive calls to customers 501-1,000 in order to increase the likelihood/probability that the customer will be connected to the IVR based system, and the debt will be collected.

The IVR based system could be controlled by the enterprise such that campaigns are created, monitored and modified if needed. In an example, a campaign includes automatically directing one or more outbound calls to one or more end users (i.e. customers) to perform one or more tasks (e.g. bill collecting). In an example, the campaign also includes monitoring the progress of outbound calls and controlling future outbound calls based on the results of past outbound calls (e.g. increasing the frequency of calls if the end user is not responding to the outbound calls) as determined through the monitoring.

In general, the IVR based system is controllable/configurable such that the enterprise can design campaigns to adequately meet its business needs. Although bill or debt collection is used by way of an example at several points in the discussion, the IVR technologies under consideration here are readily adaptable to implementation of other types of calling campaigns to customers or other people and/or to attempting to have called parties perform a variety of different tasks. For example, the IVR technology may be used to call end users and collect personal information from those users (e.g. name, address, phone number, social security number, credit card numbers, etc.), advertising to potential customers, solicit sales from potential customers including upgrading service and purchasing equipment, surveys, credit card expiration notification, credit card renewal, notification and agreement to terms and conditions of a contract, and notification of phone or data usage on an account, etc.

In some examples, it is beneficial to have a configurable controller (i.e. decision engine) for controlling and monitoring outbound calls of the IVR. In some examples, it is also beneficial for this decision engine to be centralized and easily configurable by various administrator users. Described below are examples of just such a decision engine.

Figure 2:
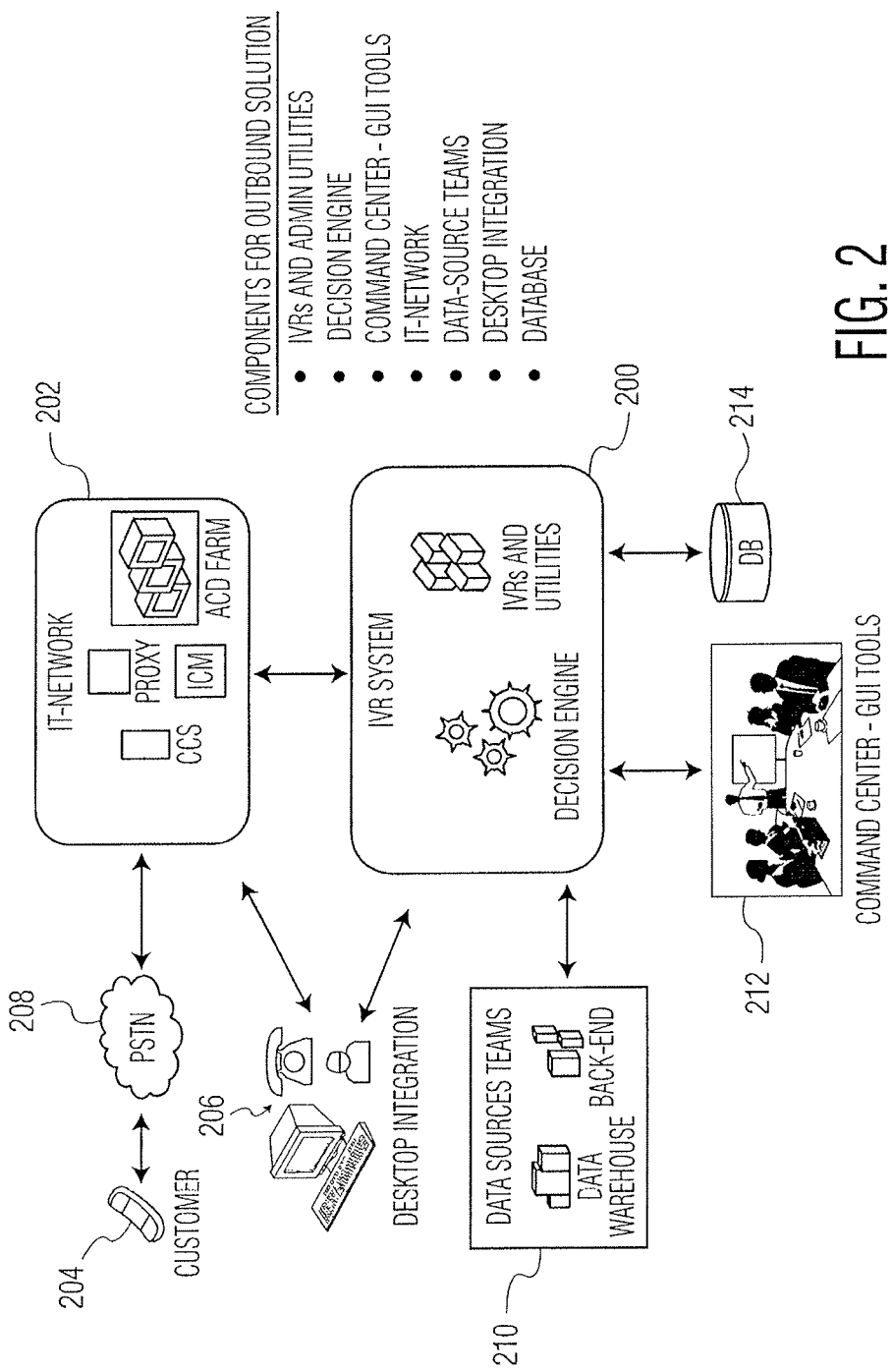
FIG. 2 shows a block diagram representing an example of the components for an outbound solution, as might be used for example by or on behalf of a mobile communication service provider.

Shown in FIG. 2 is a block diagram of outbound components for performing an outbound solution. In this example, an end user customer 204 is a callee targeted by the IVR based system 200. The outbound components of the IVR based system communicate with such a customer via a voice communication network as generally represented by PSTN 208. In this example, the outbound components include IT (information technology) network 202, IVR based system 200, data sources 210, command center 212, database 214, and desktop integration 206. In this example, the IVR based system 200 includes a decision engine, one or more IVRs and associated utilities. In general, the decision engine of IVR based system 200 is able to control the outbound solutions for performing a task (e.g. collecting on a past due accounts) with customer 204. In some examples, the IVR based system receives data records from data sources 210 and instructions from the administrator in GUI 212. GUI 212 in one example is running on a desktop computer controlled by the enterprise (e.g. the business entity itself or a debt collection agency) that is attempting to collect the debt from the customer. In one example, the IVR based system stores results of outbound campaigns in database 214.

In one example, an enterprise, using GUI 212 (running on a desktop computer for an administrator or other representative of the enterprise) can obtain customer records (e.g. phone numbers and debts owed) from data sources 210 (e.g. internal databases managed by the enterprise or third party databases). The GUI may then be used to create a campaign to collect a debt from each selected customer. For example, the campaign may attempt to collect debt from a number of customers that are grouped together as first time offenders (e.g. customers who only missed one payment). Another campaign may attempt to collect debt from a number of customers that are grouped together as repeat offenders (e.g. customers who missed multiple payments). Customers may be grouped by parameters other than payment history. Some of these grouping parameters include but are not limited to geography, amount of debt owed, elapsed time of default, etc.

In general, the decision engine runs the campaign, makes one or more calls and interacts with the person(s) answering the call(s) in one or more attempts to collect the debt from the customer. The decision engine monitors the progress and results of the campaign (e.g. whether the debt was collected or not).

For example, the calls can be monitored to determine if the customer was connected to an agent or not. If the agent collects the debt, the decision engine will be notified, and the decision engine may then remove the customer from the list so that no further calls are made to this customer. If the agent does not collect the debt, the decision engine will be notified, and the decision engine may remove this customer from the current campaign and include the customer in a more aggressive campaign where he is called more frequently. In general, different campaigns may be directed to different groups of customers (e.g. customers with small debts will be targeted by a passive campaign, whereas customers with large debts will be targeted by more aggressive campaigns).

The decision engine may also compute metrics such as statistical measures for monitoring the campaigns. These metrics may include but are not limited to number of calls connected to the IVR system, the average number of passes needed to connect a customer to the IVR system, etc.

If the campaign is successful, the results can be displayed on GUI 212. If the campaign is not successful (i.e. the debt was not collected), then the decision engine can continue the campaign and call the customer again at a later time. The enterprise can also modify the campaign parameters and monitor the campaign progress until the debt is successfully collected. Such a campaign and associated monitoring and adjustment can apply multiple times to any number of customers of the enterprise, and the GUI offers an interface for showing enterprise users aggregate results of such campaign calls to multiple individuals. The number of outbound calls and time of calls placed to one or more customers are just a few examples of the many factors that can be modified in the campaign in an attempt to increase the likelihood (i.e. probability) that the task will be completed (e.g. the debt will be successfully collected).

For example, if the customers targeted by the campaign have a low rate of connecting to a live agent, the campaign may be modified to be more aggressive towards these customers. In one example, the frequency of outbound calls to the customers can be increased. In another example, the customers may be expeditiously connected to a live agent, rather than passed through numerous automated voice prompts in the IVR system. In another example, the time of day (e.g. morning vs. evening) of the outbound call or the phone number (e.g. cell phone vs. home phone) may also be changed to increase likelihood of a successful connection with the customers.

Figure 3:
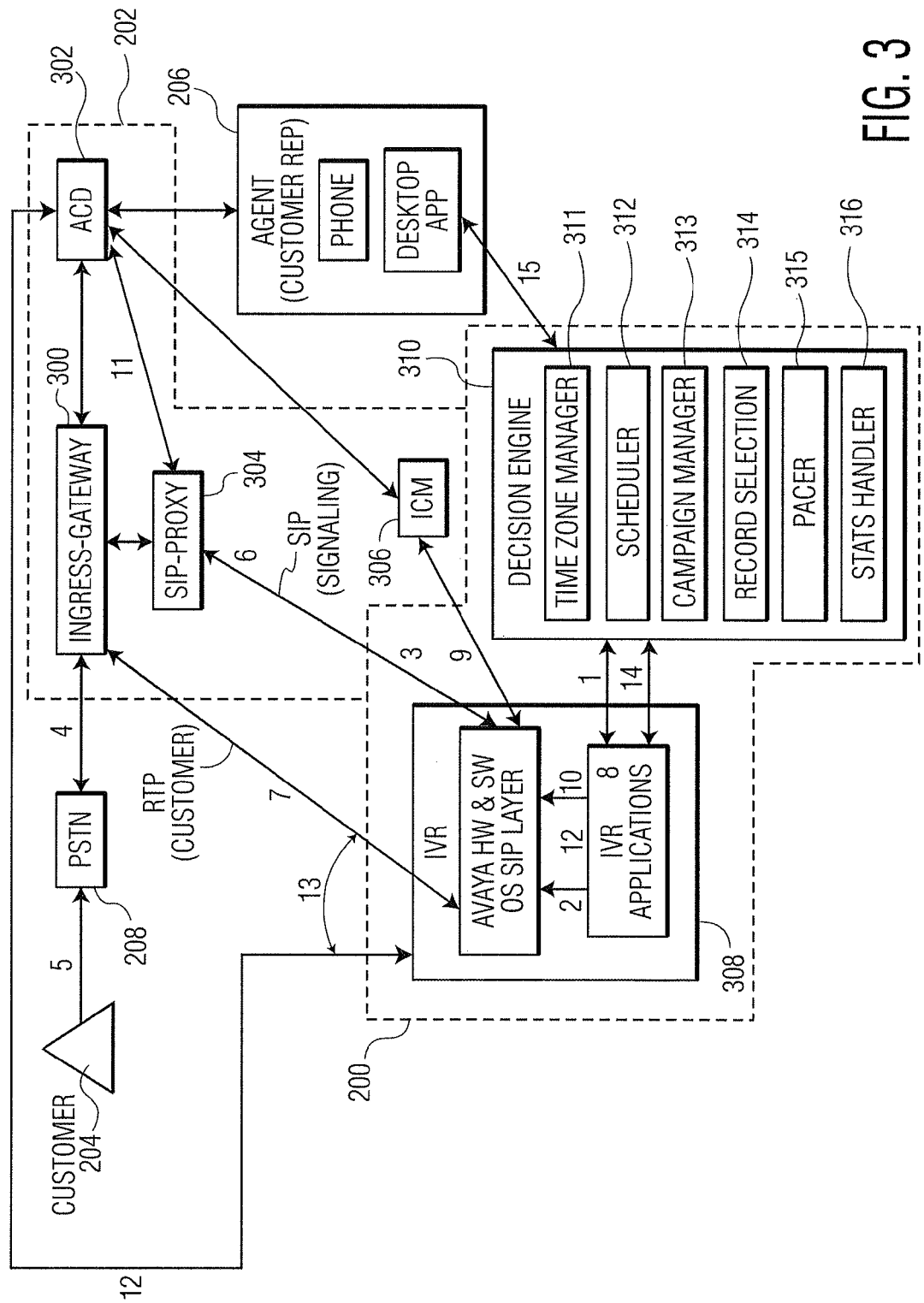
FIG. 3 shows an example of a network flow diagram of the IVR based system performing an outbound call to a customer.

A more detailed illustration of the outbound components of FIG. 2 is shown in the network flow diagram of FIG. 3 where IT network 202 includes an ingress-gateway 300, automatic call distributor (ACD) 302, session initiation protocol (SIP) Proxy 304 and a contact manager which provides routing across the ACD and IVR systems. One example of such a contact manager is CISCO Intelligent Contact Management (ICM) 306. In FIG. 3, IVR based system 200 includes IVR 308 and decision engine 310 which can control IVR 308 and other IVRs simultaneously. It is noted that the decision engine 310, the IVRs and IVR utilities are software programs being executed by at least one processor in system 200. The equipment for the data source teams, GUI and database can be located remotely from IVR based system 200 in their own computer/server devices. Communication between the various components in FIG. 2 is performed over a local or external network.

An example of a commercial IVR based system 200 is a Media Processing Server (MPS) from Avaya, such as the MPS 1000. The numbered lines between the blocks in FIG. 3 show the various communications between the different components. The various communications are numbered and are referenced in the flowchart of FIG. 4. In general, a campaign is created by personnel of the enterprise operating via the GUI on one or more terminal devices, typically, with interaction with server equipment running the appropriate application(s). Decision engine 310 (i.e. software running on a server) runs the campaign. IVR 308 then initiates an outbound call to each customer 204 identified for the campaign and attempts to accomplish a task such as collecting a debt from each called customer. The campaign may or may not connect customer 204 with a live agent 206, depending on the needs of the customer and the availability of live agents. In general the status of the campaign is reported back to decision engine 310 where a further decision regarding initiating further (i.e. future) calls to the customer or to other customers are made.

Figure 4:
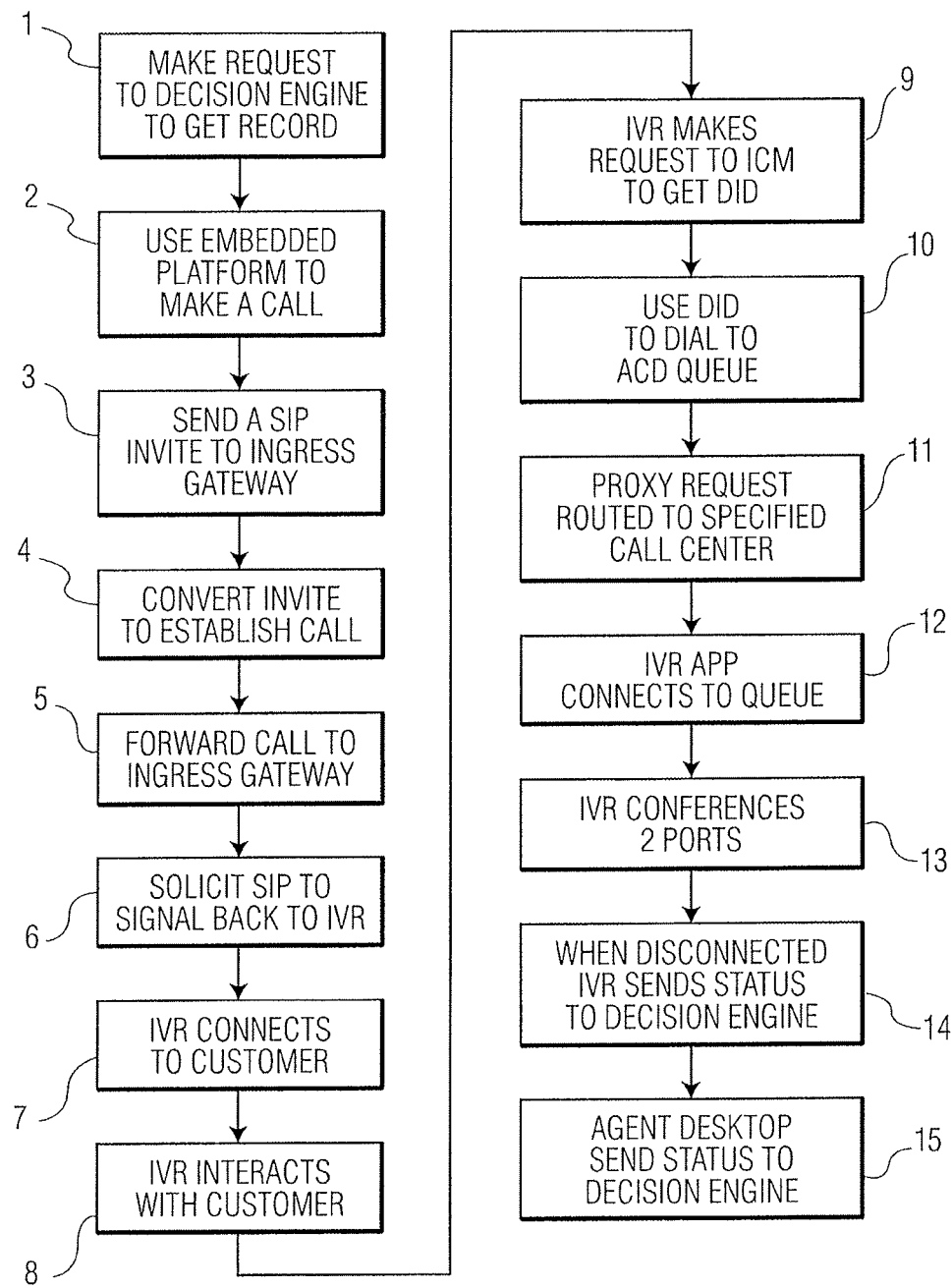
FIG. 4 is a flow chart showing exemplary steps performed by the IVR based system in FIG. 3.

Details of the communications between the various components of the outbound solution will now be described with respect to the flowchart in FIG. 4 with reference to the block diagram in FIG. 3. The flowchart in FIG. 4 shows a campaign for one call to one customer. However, it is appreciated that the flowchart in FIG. 4 can be repeated multiple times for the same customer or other customers. For a large enterprise seeking debt collection, for example, a calling campaign may entail one or more calls to one or more telephone devices of a large number of customers each of whom are past due on payment of monies owed to the enterprise. In communication 1, once an IVR port is enabled, IVR 308 makes a request to decision engine 310 to obtain dialing records for a customer.

It should be noted that the IVR in some examples is configured with 240 ports where each port can take an inbound call or make an outbound call.

In communication 2, IVR 308 has an application layer that signals a SIP layer (i.e., an imbedded platform) to initiate an outbound call. In communication 3, IVR 308 sends a SIP invite message through the network to SIP-Proxy 304 which is then sent to ingress-gateway 300. In communication 4, ingress-gateway 300 converts the invite message received from the SIP-Proxy to a specific signaling protocol for a carrier in the PSTN. In this example, the carrier is AT&T 208. Thus, the invite message is converted to a time division multiplex signal to establish a call with customer 204. Once the connection is established between the customer and the carrier, in communication 5, the call is forwarded to ingress-gateway 300.

In communication 6, ingress-gateway 300 elicits SIP-Proxy 304 in order to signal back to the IVR 308 about the call. Once ingress-gateway 300 receives an acknowledgement from IVR 308, ingress-gateway 300 cuts the voice stream to IVR 308. This allows the IVR application to be connected with the customer 304 in communication 7. In communication 8, the IVR application and IVR 308 interact with customer 204 to validate that customer 204 is the correct party. In communication 9, if the customer 204 needs to be connected with a live agent (e.g., a customer representative), IVR 308 utilizes another port to make a request to ICM 306 via a GED 125 interface. The ICM 306 then replies back with the dialing number (DID). In one example, contact manager 306 is a call router.

In communication 10, IVR 308 uses the DID number in order to dial to ACD 302 which is a queue for distributing the outbound calls to live agents when they become available. In this communication, a SIP invite message is sent to ACD queue 302. In communication 11, a SIP-Proxy request is routed to a specified call center queue in the ACD. In communication 12, the application in IVR 308 is connected to the queue. In communication 13, IVR 308 conferences two ports, one with the customer and one with the agent. This allows the customer 204 to communicate with the live agent 206.

After the agent 206 and customer 204 are finished with their dealings (e.g. the customer is finished making a payment on their account balance), the call may be disconnected. A status of the disconnected call is then sent back to the decision engine 310. In communication 15, the live agent desktop application also sends status information back to the decision engine. Thus, decision engine 310 receives information regarding the results of the agent 206 dealing with customer 204 or multiple customers, and later uses this information for further campaigns (e.g. further outbound call attempts to collect money from past due accounts).

In general, the outbound solution described with reference to FIGS. 3 and 4 is one example of a live agent dealing with a customer. A common scenario may be an example where a past due customer account is managed by the system. In this example, the IVR based system receives a daily file that includes accounts from customers which are past due. Specific customer information is included in this file including customer name, contact numbers, address and past due amount, etc.

In one example, the decision engine incorporates the customer records into campaigns that allow for prioritization and varied treatments for different customers. The decision engine then runs the selected campaigns which attempt to complete a task with a customer (e.g. collect a debt from the customer). In one example, decision engine calls a customer, provides the customer with menu options geared to resolving their account balance delinquency and transfers the customer to a live agent if necessary. The decision engine then tracks the results of a given customer during the campaign.

In general, one or more customers can be contacted multiple times depending on results of the campaign. For example, if the decision engine sends an outbound call to a customer and receives a busy signal, then the decision engine will then attempt to contact the customer at a later point in time. As described above, the point in time in which the decision engine will make the repeat call may be determined based on amount owed, age of delinquent account and other factors. For example, customers that owe a significant amounts on their respective accounts may be contacted a short time after the busy signal is received (i.e. more aggressive repeat calls). The decision engine then creates a result file that is utilized to keep track of campaigns for certain customers. The decision engine continually monitors and manages the progress of campaigns in order to ensure that a particular task for a particular customer is achieved (i.e., collecting on past due accounts).

In general, decision engine 310 has a responsibility to process outbound campaigns that have been created, manage these campaigns and coordinate events based on particular business rules. In some examples, a decision engine includes internal components such as a time zone manager 311 which handles time zones for each campaign based on the residence of the particular customer. In general, times of day for executing campaigns can be based in part on the time zones of the respective customers to increase the probability of connecting the customer to the IVR based system. Also included in the decision engine is a scheduler 312 which manages when to stop and start campaigns. A campaign manager 313 which is also included in the decision engine keeps track of running campaigns, initiates port allocations and handles campaign updates via GUI 212.

Decision engine 310 also includes a record selection 314, a pacer 315 and a stat handler 316. The record selection reads all records from a staging database 214 and applies campaign selection rules to obtain callable records for the customers for each campaign. The pacer decides when to increase and decrease dialing balance (i.e. the number of outbound calls being placed vs. the number of live agents that are available and the existing number of outbound calls already buffered in ACD queue 302 due in part to the lack of available agents). The stats handler periodically collects summary progress and results data of the various campaigns. The period for collection may be a fixed time period or an adjustable time period based on the number of calls being placed and/or the number of calls being connected to the IVR or a live agent. In operation, the decision engine handles requests from different external components such as the IVRS and utilities, the command center GUI 212, data sources 210 and desktop applications 206.

In some examples, the decision engine 310 receives at least the following four requests from IVRS and administrative utilities. First, a request is received for obtaining a customer's records for dialing. This is received from IVR 308. A second request is received to obtain available agent port information which is associated with dialing ports. A third request is received to provide dialing status for particular customers. A fourth request is received to provide queue data that is then provided to the pacer element. In general, all four of these requests are received from the IVR. Other requests may also be received.

In some examples, the decision engine receives requests from the GUI such as requests to create campaigns, start, stop, pause and modify campaigns. The decision engine also receives requests from the GUI for current information of ongoing campaigns so that the information can be displayed to an administrator (e.g. a business entity or other enterprise) that is operating GUI 212. Other requests include requests from data sources that contain customer records that are notified to the decision engine and desktop applications where an event is sent to the decision engine with comments and status for the results of a particular campaign.

In general, the GUI 212 is a component for business entities (i.e., administrators relying on the IVR based system) in the call center. The GUI includes tools such as action items including soft buttons/switches, search windows, display windows selectable options, etc. that allow the administrator to interact and control the IVR based system. Using the GUI tools, authorized users are able to see real time views of campaigns, their progress and results. The authorized users are also able to create, modify, start, stop and pause the campaigns. The authorized users are also able to increase and decrease the pacing for agent-based campaigns (i.e., increase or decrease the frequency of calls to a particular customer in order to perform a particular task).

In order to manage the various campaigns, decision engine 310 provides the ability to create, modify, start, stop and pause particular campaigns to perform a particular task. Shown in FIGS. 5-12 are flowcharts which show example operations of the decision engine 310. For example, some of these operations include obtaining dialing records for campaigns, starting campaigns, serving records, modifying campaign rules from the GUI, creating campaigns, updating dialing status, controlling the pacer and displaying dashboard stats to authorized users.

Figure 5:
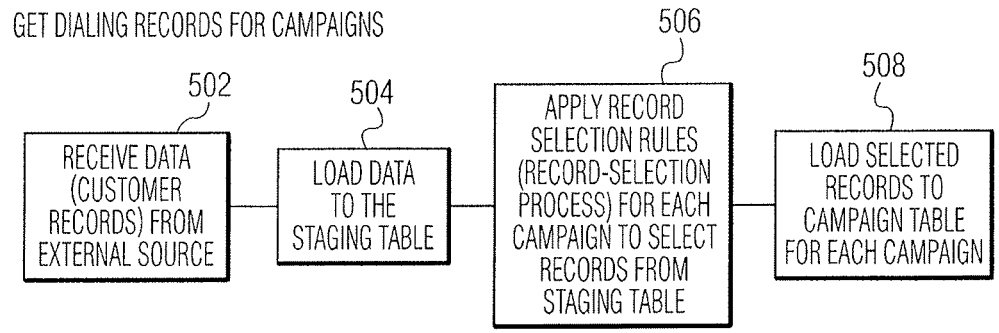
FIG. 5 is a flow chart showing exemplary steps for obtaining dialing records for campaigns.

FIG. 5 shows an operation for decision engine 310 to obtain dialing records of customers for a particular campaign. In step 502, decision engine 310 receives customer records from internal sources managed within the enterprise (e.g. debt collection databases, marketing databases, sales databases, etc.) or external sources managed by third parties (e.g. third party data collection agency). The customer records are then loaded into a staging table in step 504. In step 506, record selections for a particular campaign are applied to select records from the staging table. In step 508, the selected records from the staging table are loaded for each particular campaign. The outcome of the flowchart in FIG. 5 allows the decision engine to obtain customer dialing records which will be used for dialing throughout the day.

Figure 6:
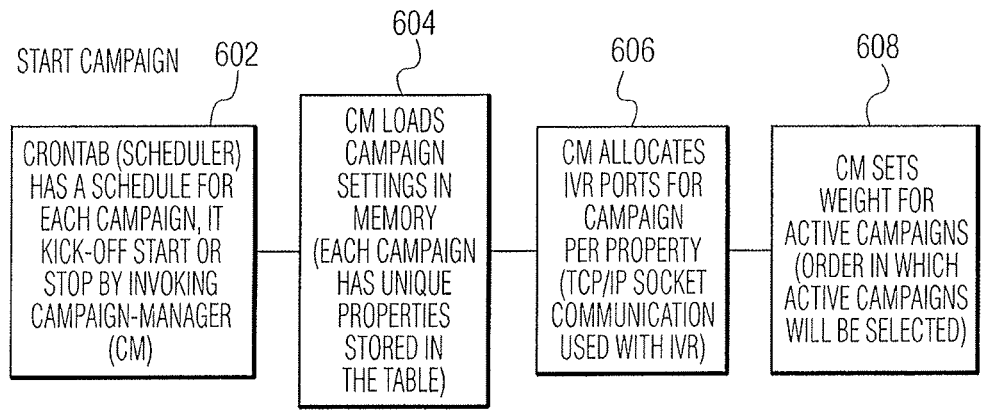
FIG. 6 is a flow chart showing exemplary steps for starting a campaign.

The flowchart in FIG. 6 shows the operation for starting a particular campaign. In step 602, the scheduler has a particular schedule for each campaign and starts the campaign by invoking the campaign manager. In step 604, the campaign manager loads the campaign setting into memory. In step 606, the campaign manager allocates specific IVR ports for specific campaigns. In step 608, the campaign manager then sets the weights for active campaigns (i.e., the higher the weight the more priority a particular campaign is given). For example, a campaign may be given a high weight if the campaign is targeting a large number of customers that require a large number of ports. In another example, a campaign may be given a high weight if the customers targeted are high debt customers. In general, the outcome of the flowchart in FIG. 6 allows the campaign to be initialized and started.

Figure 7:
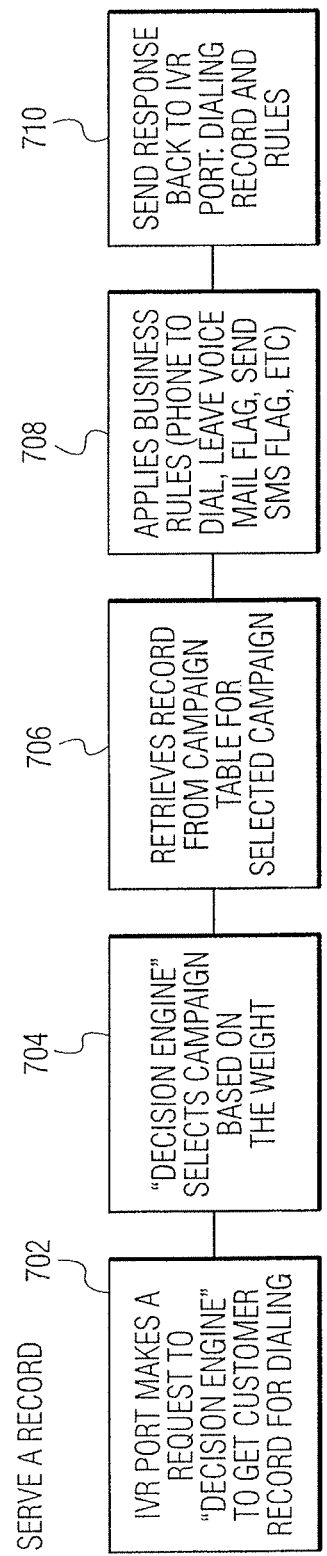
FIG. 7 is a flow chart showing exemplary steps for obtaining a customer record for dialing.

An operation of serving a record to a customer is shown in the flowchart of FIG. 7. Specifically, in step 702, the IVR makes a request to decision engine 310 to obtain a particular customer record for dialing. In step 704, the decision engine selects a campaign based on the weight of the campaign. In step 706, the decision engine retrieves records from the campaign table for the selected campaign. The decision engine then applies business rules such as making phone calls, leaving voicemail messages and sending SMS to a customer as shown in step 708. For example, a phone call may be the initial default contact method. If the phone call fails a specified number of times, the system may be set to automatically switch to sending text messages in an attempt to connect with the customer. In step 710, the decision engine sends responses back to the IVR which gives the IVR the dialing records for the customer. The outcome of the flowchart in FIG. 7 allows the IVR to obtain the dialing records for a particular customer.

Figure 8:
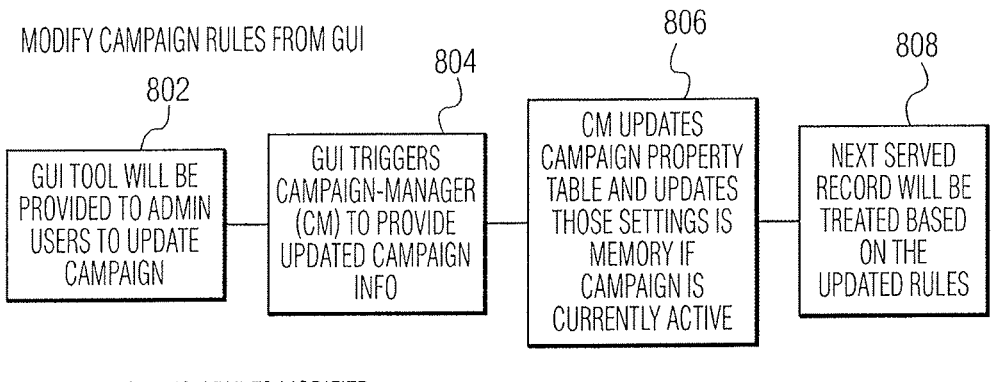
FIG. 8 is a flow chart showing exemplary steps for modifying campaign rules.

The operation of modifying campaign rules via the GUI is shown in the flowchart of FIG. 8. Specifically, in step 802 the administrator utilizes the GUI tool to update a particular campaign by providing updated rules. In step 804, the GUI sends the updated campaign information to the campaign manager. In step 806, the campaign manager updates the campaign if the campaign. In step 808, the record of the next customer is treated based on the updated rules. An outcome of the flowchart in FIG. 6 is that the GUI allows the administrator to find the campaign rules for a particular campaign.

Figure 9:
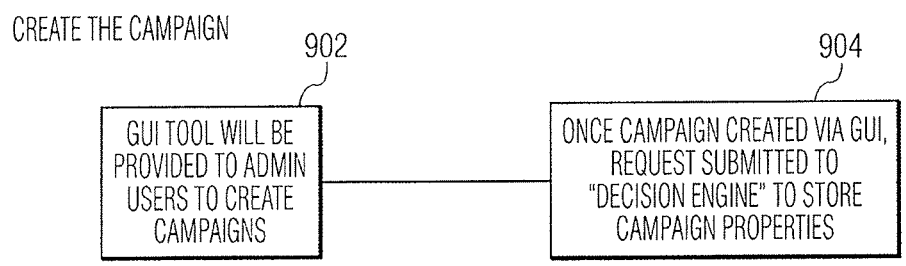
FIG. 9 is a flow chart showing exemplary steps for creating a campaign.

An example operation of creating a campaign is shown in the flowchart in FIG. 9. Specifically, in step 902 the GUI tool is utilized to provide the administrator to create particular campaigns for particular users. In step 904, the GUI allows the administrator to request to store particular campaign properties. These campaign properties are then be utilized by the decision engine to run the campaign. An outcome of the flowchart in FIG. 9 is that the administrator user utilizes the GUI to create a new campaign for a segment of customers.

Figure 10:
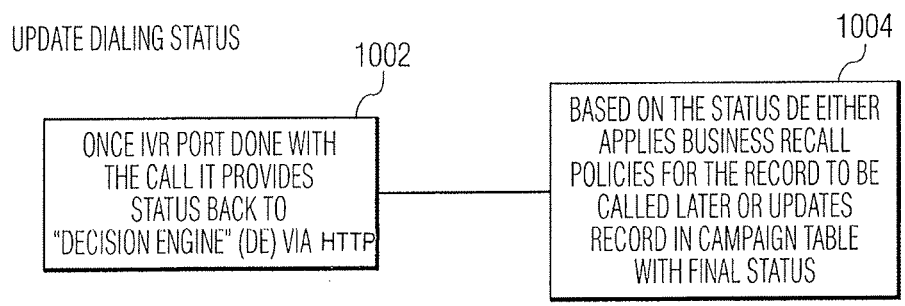
FIG. 10 is a flow chart showing exemplary steps for updating dialing status.

The operation of updating a dialing status of a customer is shown in the flowchart of FIG. 10. In step 1002, the status of the call is provided back to the decision engine once the IVR port is done. In step 1004, the record is updated in a campaign table with the final status to determine when a task has been completed or if the customer needs to be recalled later in the day. An outcome of the flowchart in FIG. 10 is that the dialing record allows the customer to either be scheduled to be recalled later in the day or has a final status for the day for a particular customer.

Figure 11:
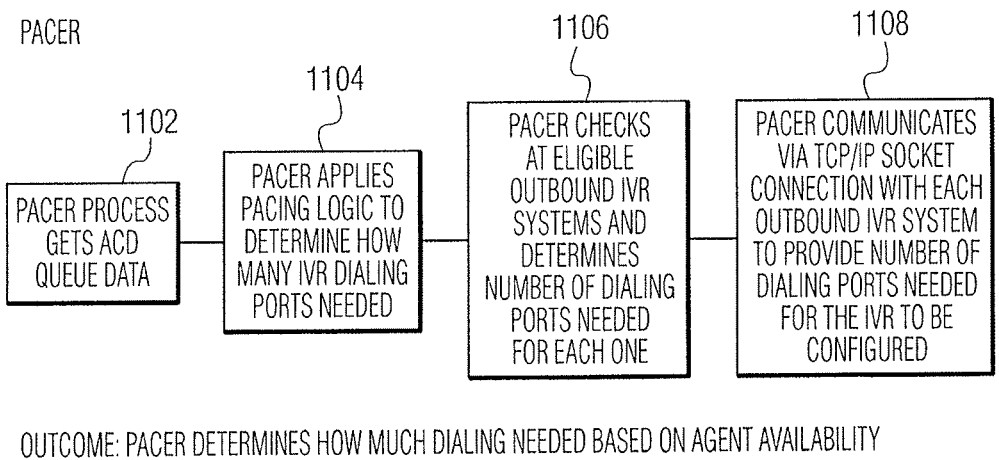
FIG. 11 is a flow chart showing exemplary steps for pacing the outbound calls.

An operation of the pacing mechanism in the decision engine is shown in the flowchart of FIG. 11. Specifically, step 1102 shows that the pacer obtains the queue data to determine how many callers are in the queue. In step 1104, the pacer applies pacing logic to determine how many IVR dialing ports are needed for the campaigns. In step 1106, the pacer checks to determine how many ports are needed for the various campaigns. In step 1108, the pacer communicates to each outbound IVR based system to provide a number of dialing ports needed for IVR to be configured. An outcome of the flowchart in FIG. 11 is that the pacer determines how much dialing is needed based on agent availability. For example, if there are a large number of agents and relatively few customers in the call queue, then the decision engine may control the IVR based system to increase the number of outbound calls. However, in another example, if there are a low number of available agents and a large number of callers already in the customer queue, then the decision engine may control the IVR based system to decrease the number of outbound calls. The number of outbound calls can also be determined in part based on whether the customer needs to interact with a live agent or can perform a particular task utilizing only the IVR based system.

Figure 12:
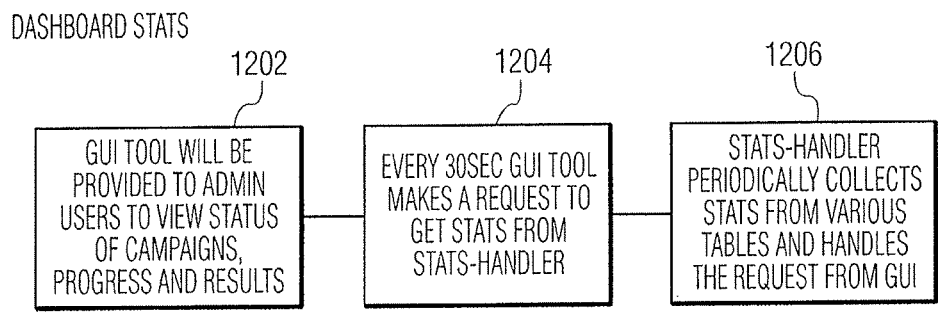
FIG. 12 is a flow chart showing exemplary steps for obtaining statistics for the outbound calls.

The operation of displaying dashboard stats for a particular campaign is shown in the flowchart of FIG. 12. Specifically, in step 1202, the GUI tool (running on an administrator computer) allows the administrator (e.g. business entity) to view status of campaigns, progress of the campaigns and particular results of the campaigns. In step 1204, the GUI makes periodic requests (e.g., every 30 seconds) to obtain statistics of campaigns from the statistics handler. In step 1206, the statistics handler periodically collects statistics from various tables and handles requests from the GUI. The outcome of the flowchart in FIG. 12 is that the GUI is able to retrieve statistics (i.e., status, progress and results) from various campaigns and display those results to the administrator.

Essentially, the IVR based system allows a centralized component (i.e., a decision engine) to manage critical aspects of the IVR based system and thereby manage outbound campaign solutions. The decision engine is also responsible for managing requests from components external to the IVR based system based on business rules and logic for particular businesses. The decision engine is easily configurable due to a GUI tool that allows administrators of a business to manage and monitor the various campaigns.

The various functions of the overall IVR based system shown in the figures (e.g. IVR, decision engine, desktop integration, data source teams, command center, IVR utilities, ICM, ACD, etc.) and described above can be implemented in digital electronic circuitry, in computer software, firmware or hardware (e.g. microprocessor, ASIC, FPGA, RAM, ROM, etc.). The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the IVR-related techniques outlined in this disclosure may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into another computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the IVR-related techniques discussed in this disclosure. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims.

What is claimed is:

1. A method comprising the steps of:
   creating, by a decision engine processor of an interactive voice response (IVR) based system, a campaign for performing at least one outbound call to at least one end user to execute at least one task, the creating being performed in response to the decision engine processor receiving instructions from an authorized administrator through a graphical user interface (GUI) of a terminal device that is in communication with the IVR platform;
   calling, by an IVR processor of the IVR based system, the at least one end user based on the created campaign;
   recording in a database, by the decision engine processor of the IVR based system, results of the call which indicate execution status of the at least one task;
   sending, by the decision engine processor of the IVR based system, results of the call to the terminal device where the results are displayed on the GUI;
   receiving, by the decision engine processor of the IVR based system, from the terminal device, an administrator's analysis of the results of the call input through the GUI; and
   controlling, by the decision engine processor of the IVR based system, future outbound calls made by the IVR processor for the campaign based on the administrator's analysis of the results of the at least one call.

2. The method of claim 1, further comprising:
   scheduling, by the IVR based system, when to start and stop the campaign based on the results of the at least one call.

3. The method of claim 1, further comprising:
buffering, by the IVR based system, a number of outgoing calls in an agent queue when there are more outgoing calls than available agents; and
pacing, by the IVR based system, the campaign based on the number of outgoing calls in an agent queue and a number of agents that are available.

4. The method of claim 1, further comprising:
selecting, by the IVR based system, end user records for the campaign before the campaign is started.

5. The method of claim 1, further comprising:
collecting, by the IVR based system, the results of the campaign periodically and computing metrics based on these results, the metrics including at least one of a number of calls made for the campaign, length of the calls and frequency of the calls.

6. The method of claim 1, further comprising:
controlling, by the IVR, the campaign based on a time zone of the end user, such that the campaign is started at a time selected to increase a probability that the task will be successful.

7. The method of claim 1,
wherein a business entity operates the IVR based system to execute tasks including at least one of collecting payment from the end user and collecting personal information from the end user.

8. A system, comprising:
an interactive voice response (IVR) platform including an IVR processor configured to provide automated voice call communication through a network, to transmit information in a voice format and to receive user inputs, via voice calls through the network; and
a decision engine including a processor configured to:
create a campaign which instructs the IVR processor to perform at least one outbound call to at least one end user to execute at least one task, the creating being performed in response to the decision engine processor receiving instructions from an authorized administrator through a graphical user interface (GUI) of a terminal device that is in communication with the IVR platform;
initiate a call to the at least one end user through the IVR processor based on the created campaign;
record results of the call in a database which indicate execution status of the at least one task; and
control one or more future outbound calls made for the campaign by the IVR processor based on the authorized administrators analysis of the results of the at least one call displayed on the GUI of the terminal device.

9. The system of claim 8,
wherein the decision engine includes a campaign manager configured to perform at least one of scheduling, monitoring and updating the campaign based on the results of the at least one call.

10. The system of claim 8,
wherein the decision engine is configured to handle requests from administrative utilities, including at least one of a request for the end user records, and a request to obtain an available port for making the outbound call.

11. The system of claim 8,
wherein the decision engine is configured to handle requests from a graphical user interface (GUI), including at least one of a request to create the campaign, a request to start, stop or pause the campaign, a request to modify the campaign, and a request to view the status and real time results of the campaign.

12. The system of claim 8,
wherein the decision engine receives data files including customer records, and uses the data files to create the campaign for specific users.

13. The system of claim 8,
wherein the decision engine receives results from an agent desktop application, when an agent is finished dealing with the customer during the campaign, and the decision engine uses the results to further modify the campaign for future outbound calls.

14. The system of claim 8,
wherein the decision engine executes tasks which include at least one of collecting payment from the end user and collecting personal information from the end user, such that a business entity goals are met with respect to the end user.

15. A system, comprising:
an interactive voice response (IVR) platform including an IVR processor configured to provide automated voice call communication through a network, to transmit information in a voice format and to receive user inputs, via voice calls through the network;
a graphical user interface (GUI), presented via a terminal device in communication with the IVR based system, configured to allow an authorized administrator to:
control a decision engine processor of the IVR platform to create a campaign to instruct the IVR processor to perform at least one outbound call to at least one end user to execute at least one task;
control the GUI of the terminal device to display results of the at least one call which indicates execution status of the at least one task; and
control the decision engine processor to control the future outbound calls made for the campaign based on the administrator's analysis of the results of the at least one call.

16. The system of claim 15, including:
an action item on the GUI including at least one of a virtual button or switch that allows the administrator to create, start, stop or pause the campaign.

17. The system of claim 15, further comprising:
an action item on the GUI including at least one of a virtual button or switch that allows the administrator to modify or update the campaign after the execution of the campaign or in real time.

18. The system of claim 15, further comprising:
a display on the GUI including at least one of a virtual window that allows the administrator to view the status and results of the campaign.

19. The system of claim 15, further comprising:
an action item on the GUI including at least one of a virtual button or switch that allows the administrator to modify or update the task of the campaign.

20. The system of claim 15,
wherein the task includes at least one of collecting debt, advertising products or services, selling products or services, surveys, credit card expiration notification, credit card renewal, notification and agreement to terms and conditions of a contract, and notification of phone or data usage on an account.

* * * * *